(12) United States Patent
Ragner et al.

(10) Patent No.: US 6,175,196 B1
(45) Date of Patent: Jan. 16, 2001

(54) PHOTO-SENSITIVE ILLUMINATED SKATE WHEEL

(76) Inventors: Gary Dean Ragner, 711 SW. 75th St. #103, Gainesville, FL (US) 32607; Tom Earl Duntley, 522 Sears Dr., Patterson, CA (US) 95363

( * ) Notice: Under 35 U.S.C. 154(b), the term of this patent shall be extended for 0 days.

(21) Appl. No.: 09/346,918

(22) Filed: Jul. 2, 1999

(51) Int. Cl.$^7$ .................................................. H05B 37/00
(52) U.S. Cl. ..................... 315/200 A; 315/149; 315/156; 362/500
(58) Field of Search .................... 362/500, 251, 362/802; 315/200 A, 149, 150, 156, 151

(56) References Cited

U.S. PATENT DOCUMENTS

| | | | |
|---|---|---|---|
| 3,769,519 | * 10/1973 | Adamian | 307/10 |
| 4,281,365 | * 7/1981 | Elving et al. | 362/20 |
| 4,298,910 | * 11/1981 | Price | 362/35 |
| 4,363,502 | * 12/1982 | Bakerman | 280/816 |
| 4,867,727 | * 9/1989 | Lanius | 446/242 |
| 4,956,562 | * 9/1990 | Benedict et al. | 307/10.8 |
| 5,278,732 | * 1/1994 | Frankum | 362/72 |
| 5,278,733 | * 1/1994 | St. Thomas | 362/78 |
| 5,294,188 | * 3/1994 | Vancil, Jr. | 301/5.3 |
| 5,475,572 | * 12/1995 | Tseng | 362/78 |
| 5,536,074 | * 7/1996 | Hsu et al. | 301/5.3 |
| 5,552,972 | * 9/1996 | Rezvant | 362/78 |
| 5,580,093 | * 12/1996 | Conway | 280/816 |
| 5,614,788 | * 3/1997 | Mullins et al. | 315/82 |
| 5,642,236 | * 6/1997 | Mazurek | 359/840 |
| 5,653,523 | * 8/1997 | Roberts | 362/78 |
| 5,683,164 | * 11/1997 | Chien | 362/78 |
| 5,718,499 | * 2/1998 | De Caro | 362/78 |
| 5,803,574 | * 9/1998 | Szaniszlo | 362/32 |
| 5,839,814 | * 11/1998 | Roberts | 362/78 |

\* cited by examiner

*Primary Examiner*—Don Wong
*Assistant Examiner*—Tuyet T. Vo (57) ABSTRACT

The disclosed safety light (15) is designed to provide automatic operation for safety lights placed on rotating assemblies such as wheels, flying disks, and etc. Safety light (15) comprises a battery (20), acceleration/motion sensor (22), photo sensor (24), and illumination device (26) placed substantially in series with one other. Battery(20) provides electromotive power to operate all circuitry. The acceleration/motion sensor(22) is designed to conduct current when a specific acceleration or motion is detected. The photo sensor (24) conducts current when photo detector(25) detects a sufficiently low level of light. When both acceleration sensor(22) and photo sensor(24) are conducting, current will flow and illuminate illumination device(26). Alternatively, a time delay may be added to the acceleration/motion sensor(22) to delay shut-off of current to the illumination device(26), and a time delay may be added to the photo sensor(24) to delay turn-on of current to illumination device(26) when light level is suddenly reduced.

4 Claims, 7 Drawing Sheets

PHOTO-SENSITIVE ILLUMINATED SKATE WHEEL

BACKGROUND

This invention relates to automatic lighting systems and more specifically to lighting systems which automatically activate when in the dark.

BACKGROUND—DESCRIPTION OF PRIOR ART

The use of lights on rotating assemblies, such as, bicycle and skate wheels (roller skate and in-line skate wheels) is well known. Flying disks and yo-yos are other rotating assemblies which have included lights. Lights placed on bicycles and skate wheels provide safety for the rider by alerting motorists of there presence in the dark. Reflectors provide some safety, but they only provide illumination when directly in the headlights of a motor vehicle, at which time it may be to late. To provide greater safety, lights are mounted on the wheels of bicycles and roller blade skates to actively generate light which has a rotating pattern to it. This rotating pattern easily catches ones eye and is easily identified as a rolling wheel even when no other part of the bicyclist or roller blade skater can be seen.

Most systems for illuminating these wheels involve a battery, a manual switch and a light connected in series. The only problem with this design is that it must be turned on by the user and also turned off. Since the most likely user of such a wheel safety light is children it is unlikely that such a system will be used properly. Either the light is not turned on at dusk or when they are turned-on, the light is not turned-off, thus draining the battery.

To get around these problem a number of inventions have been designed which use the rotating motion of the wheel or toy to generate electricity to power the lights. In this way there are no switches to turn on and off and no batteries to change. Examples of such generator powered wheels are shown in U.S. Pat. No. 5,718,499 to Caro for a "Roller Blade Wheel Lighting System", U.S. Pat. No. 5,580,093 to Conway for a "Light Generating and Emitting Roller Skate Wheel", and U.S. Pat. No. 5,552,972 to Rezvani for a "Self-Powered Lighted Wheel. However, these systems are complicated, heavy, expensive to build; and are prone to failure under the harsh environment kids place them in. They also create a constant drag on a rider or skater which is undesirable. These systems also require specially designed skate shoes and attachments to bicycles which adds to cost. The invention disclosed here does not suffer from these problems and can be used with standard roller skates and bicycles and be completely sealed inside a plastic or urethane housing with no moving parts and no external switches.

Another way inventors have tried to eliminate the use of external switches is to include an acceleration sensor (i.e. motion sensor, acceleration switch, accelerometer, etc.). By including such a circuit, battery power is conserved because the lights are only on when in use. The use of acceleration sensors are shown in U.S. Pat. No. 5,683,164 to Chien for an "Illuminated Wheel", U.S. Pat. No. 5,536,074 to Hsu for a "Light-Generating Wheel for an In-line Skate", U.S. Pat. No. 5,475,572 to Tseng for a "Light Emitting Roller for Roller Skates", U.S. Pat. No. 5,294,188 to Vancil for an "Illuminated Roller Skate Wheel", U.S. Pat. No. 5,278,733 to Thomas for a "Light Apparatus For Roller Skate", U.S. Pat. No. 5,278,732 to Thomas for a "Bicycle Wheel Portable Light and Reflector", U.S. Pat. No. 4,867,727 to Lanius for a "Toy Including Centrifugal Switch", and U.S. Pat. No. 4,363,502 to Rakerman for an "Illuminative Skate Wheel". More advanced designs include circuit delays such as that shown in U.S. Pat. No. 5,653,523 to Roberts for a "Miniature Centrifugal Lighting Assembly". In this last design lights are made to stay on for a short time even when motion is not detected. This is to allow the lights to continue operating even if the user pauses for a moment to rest, but shuts off after a predetermined time period. These designs are all workable systems, but still waste a great deal of battery power to lights during the daytime. The proposed invention does not suffer from this limitation. An Acceleration switch limits power usage to only times of use, and a photo sensor only allows power drain during times of darkness. This combination saves battery power during daylight hours by keeping the lights off, resulting in battery use that is over four times less that Roberts centrifugal light design. Because the battery is easily the most costly part of the entire circuit, the use of a smaller battery can save money and space in the design. In fact, the proposed safety light saves so much power that the circuit can be completely sealed inside a housing and the batteries never need to be changed for the life of the device. An in-line roller skate wheel lasts 50 to 200 hours depending on the surface it is used on. If we assume that less than 25 percent of the time it will be used in the dark an operational battery life of approximately 30 to 50 hours should be sufficient to last the life of the wheel. The circuits disclosed here also continue producing light long after this 50 hours though at a much lower level. Without the photo sensor circuit such roller blade wheels would run out of power long before the wheel was thrown away, or would require much larger batteries or operate at much lower power, and thus, less visibility. This is a safety hazard for children since they will in general use the wheel until it is completely wore out. The circuit can also be mounted on a bicycle for safety, having 500 to 1,000 hours of battery life on a bike expected to last 5,000 hours. The addition of a photo sensor adds very little to the cost of the circuit, and more than pays for itself by reducing the size of the battery and allowing operation of the bike during the day without draining the battery. The circuit also has some obscure safety applications such as for frisbees or flying disks for throwing at night. For this application very few hours of operational life would be needed since the disk would be illuminated only while in flight at night.

OBJECTIVES AND ADVANTAGES

Accordingly, several objects and advantages of our invention are:

a) To provide an automatic battery-powered lighting systems for rotating assemblies where the battery lasts the life of the device.

b) To provide a safety light that activates only when both the rotation of the assembly is detected and when a low ambient light level is detected, thus conserving power for times when it is actually needed.

c) To provide a delayed turn-off of safety light illumination when acceleration is no longer detected, thus providing safety illumination even when the user momentarily stops.

d) To provide a delayed turn-on of safety light when ambient light is intermittently blocked, such as, periodic rotation of the safety light behind wheel supports. The delay prevents the illumination device from turning fully on during these times, thus saving battery power during the day for wheels that are partially shrouded.

e) To provide a means for using a much smaller battery than would normally be possible, where substantial reductions in power consumption is achieved by limiting activation of the safety light to only times when the assembly is rotating and also in a dark environment.

f) To eliminate external switches and eliminate batteries changes, whereby the Safety Light can be completely sealed within its housing to provide a water-tight and air-tight enclosure.

g) To use Light Emitting Diodes (LEDs) to provide efficient light production to further extending battery life.

h) To provide the combination of high efficiency LEDs and Lithium battery which makes a very compact lighting system with an exceptionally long operational life.

i) To provide a safety light for wheeled vehicles that is highly reliable, and automatically activating when needed.

j) To provide a safety light for toy flying discs and yo-yos that uses substantial power only when being used in the dark.

k) To provide a safety light compact enough to fit within an in-line roller skate wheel and illuminating the wheel only when used in the dark.

l) To provide a safety light which allows brighter operation for a given battery size and operational life by reducing actual "ON" time to only times when motion is detected and low ambient light is detected.

The Safety Light disclosed here is an illumination circuit which is designed to conserve battery power to times when a rotating assembly is in use and is also in the dark. This automatic control of the safety light allows battery power to be used only when the light is actually needed. This greatly extends battery life, making it possible to construct circuits that last the life of the assembly. With no batteries to change, the circuit can be molded directly into the assembly, reducing parts and manufacturing costs, while at the same time improving reliability. It has the added benefit of working automatically so children and the forgetful will still be protected at night. The elimination of batteries to change, no external switches, and automatic activation at night make this safety light truly remarkable.

DETAILED DESCRIPTION OF THE PREFERRED EMBODIMENTS

Figure 1:
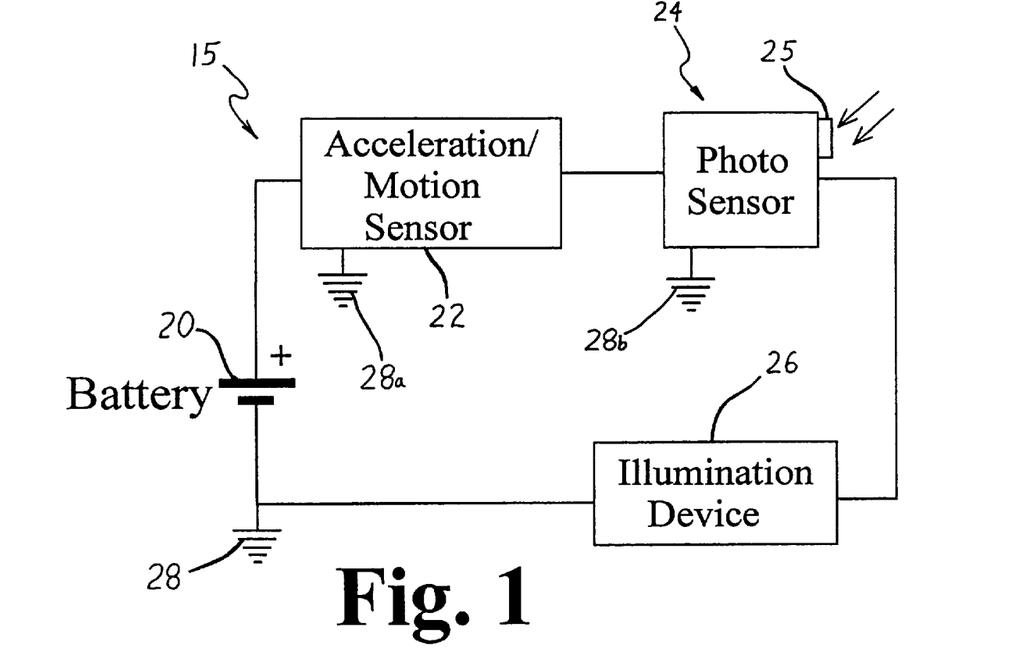
FIG. 1 Safety Light Circuit Diagram.

With reference to the drawings, we see in FIG. 1 safety light circuit 15 constructed of a battery 20, an acceleration or motion sensor 22, a photo sensor 24, and an illumination device 26. Most or all of the current from battery 20 flows in series through acceleration sensor 22, photo sensor 24 and illumination device 26. Acceleration sensor 22 and photo sensor 24 act as control switches in a series circuit, passing current to illumination device 26 only when both sensors are conducting. Grounding of the sensors with floating ground 28 is optional. The sensors can be grounded to at points 28a and 28b which are electrically the same as ground 28. The grounding of the sensors is optional but may become needed as battery voltage is reduced below 2.5 volts when using LEDs. This is because each sensor must have a smaller and smaller voltage drop across its circuit to still provide sufficient voltage to the illumination device when all current is in series. For this reason, at low battery voltages, a small amount of current can be drawn off to operate one or more of the sensor circuits. The current used by the circuits is small compared to the current flow through the illumination device. For circuits using a light emitting diode (LED) for the illumination device a limiting resistor in series is often used, however, in the disclosed designs it is generally not needed to limit current, because battery 20 is generally so small that its own internal resistance is sufficient to limit current to the LED. Also the photo sensor or acceleration sensor can further limit current flow by its design if larger batteries are used.

Battery 20 can be any battery comprising one or more cells of lithium, alkaline, carbon zinc, fuel cells, supercapacitor, or any other self-contained current source. Two or more cells may needed in series to have sufficient voltage to operate illumination device 26. To save on battery size the battery or batteries should be of a voltage as close to the operating voltage of illumination device 26 as possible. Also the in-series voltage drop across sensors 22 and 24 should be as small as possible to provide the most efficient use of battery power.

Acceleration sensor 22 can be any of a number of standard designs. One of the simplest is an acceleration switch which uses a spring mass inside a metal can (see FIG. 3). When sufficient acceleration is experienced the mass contacts the wall of the metal can and current is conducted. Another option is to use an accelerometer on a Integrated Circuit (IC). A simple circuit can be designed around such an IC to conduct current at a pre-programmed acceleration value, thus conducting current when acceleration is detected. Sensors that detect rotational acceleration can also be use, and even infrared motion sensors would work. However, IR motion sensors would sense movements external from itself, turning on even when not in use when someone walked passed. Also note that ground 28a is optional since an acceleration switch need not be grounded to operate and if an IC accelerometer were used the ground still would not be needed if sufficient voltage drop within the circuit is present to operate the circuit.

Photo sensor 24 can be any number of standard photo sensing circuits which conduct current when insufficient light is present. These photo circuits uses a photo cell 25 (photo sensing device) to detect light and control the photo sensor circuit. Any number of photo sensing devices could be used to detect light, including, Cadmium Sulfide photoresistors(CDS), lead sulfide photoresistors, photo diodes, photovoltaic cells, phototransistors, photo-Darlington transistors and other light sensing devices. For this discussion we will be using Cadmium Sulfide photoresistors and phototransistors in our examples, however, any of the above mentioned photo sensing devices could be used in the circuits to replace those discussed here. Some of the photo sensing devices listed above would require modification of the circuits shown in FIGS. 3 through 5 to operate properly, but photo sensing circuits are well known and any of a number of standard circuit designs could be used in place of the photo sensing circuits shown. Also note that ground 28b is optional if the voltage drop across the circuit within photo sensor 24 is sufficient to operate that circuit.

Illumination device 26 consists of one or more illuminating devices such as Light Emitting Diodes (LEDs), incandescent bulbs, fluorescent tubes, neon bulbs, and etc. For our discussion LEDs will be the illuminating device of choice because of there small size, efficient operation and long life, however, any number of other illumination devices could be used in its place. The voltage drop across a Super-Bright LED is approximately 1.8 to 2.2 volts. Where 1.8 volts has the LED just turning on and 2.2 volts is near maximum rated power. The circuit is designed such that illumination device 26 only has significant current flowing through it when acceleration sensor 22 has detected sufficient acceleration, and photo sensor 24 has detected the absence of sufficient light.

Figure 2:
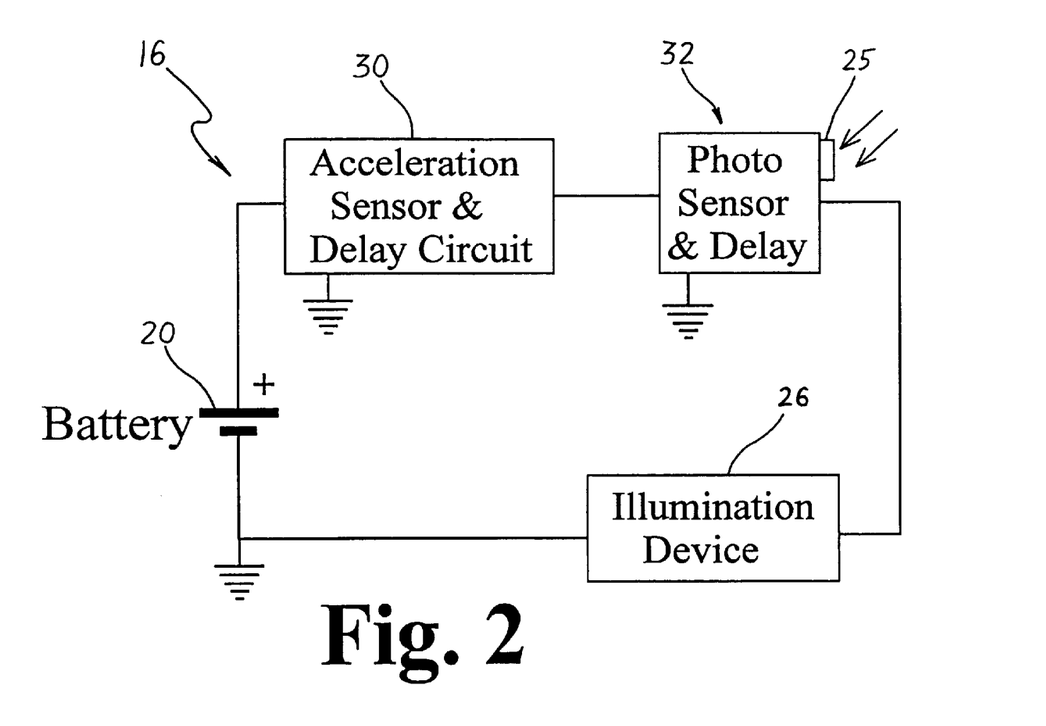
FIG. 2 Circuit Diagram of Safety Light Circuit with Delay Circuits.

FIG. 2 shows circuit 16 which is the same basic circuit as in FIG. 1, except a delay circuit has been added to both the acceleration sensor and to the photo sensor. Either one or both of these sensors can have the delay added depending on the application of the circuit.

Acceleration sensor 30 includes a delay circuit to keep current flowing for a predetermined amount of time after sufficient acceleration is no longer detected. This has the advantage in applications such as in-line roller skates and bikes in that the user can stop or roll slowly and motorists can still see them. Also such a delay circuit provides continuous light even if the acceleration sensor is conducting only intermittently. This could be very useful if an acceleration switch is getting old and not making good contact all the time. Also the acceleration switch need not be made to very exacting standards since vibrations of the spring will make momentary contact well below its rated acceleration rating. This is good since bike wheels must turn relatively rapidly to provide more than 3 gees(30 m/sec$^2$) constant acceleration. The delay circuit is optional, but without it, light output would be more prone to flashing because of vibrations experienced during operation. This flashing effect can actually be good for some types of use where lighting effects is important.

Photo sensor 32 can also include a delay, but this delay is designed to keep current off for a short time when there is suddenly low ambient light detected. This type of delay would be used on wheels that periodically rotate photo cell 25 into a dark area. For example, looking at the standard in-line roller skate in FIG. 6 we see safety wheel 100 mounted between a pair of wheel supports 81a and 81b which form an upside-down U-shaped channel running the length of the skate. When the photo cell is up in this channel it experiences much darker conditions than when it is in the open near the ground. Thus, by delaying current turn-on by the photo sensor, battery energy will be conserve during the day when the photo cell may experience momentary darkness.

Figure 3:
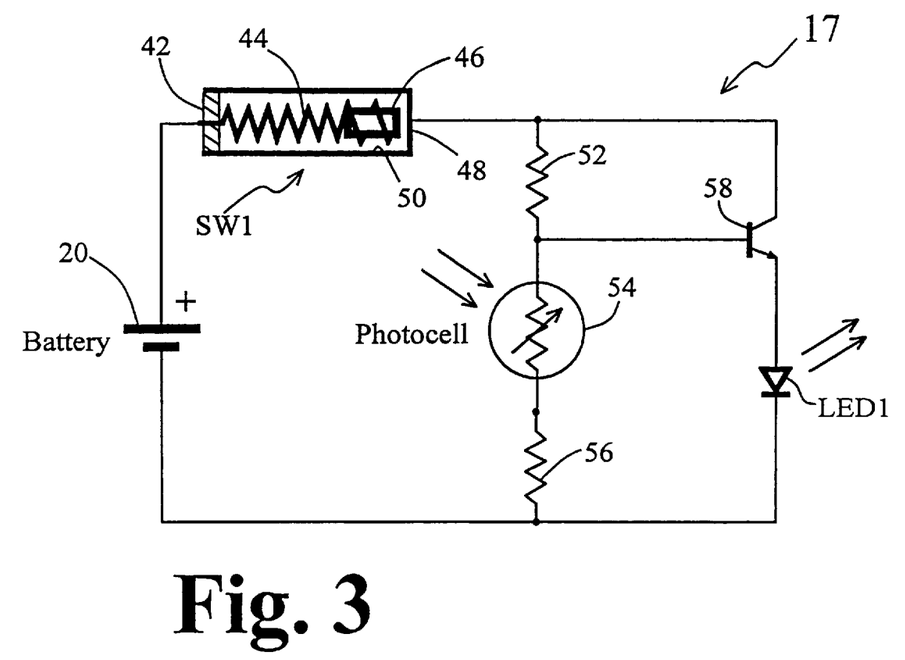
FIG. 3 Safety Light Circuit Schematic.

In FIG. 3 we see circuit schematic 17 which is one example of a safety light circuit. Battery 20 provides power for the circuit, and acceleration switch 40 provides conduction when sufficient acceleration is detected. Switch 40 is a standard design having mass 46 on the end of spring 44 which is fitted inside a metal can 48 and sealed in place with an insulating plug 42. When sufficient acceleration is encountered the mass bends the spring and causes electrical contact between the spring and the inside 50 of the metal can, thus completing the circuit. Once power is provide by the acceleration switch, resistors 52 and 56 provide a voltage divider that biases transistor 58 which acts as a current switch. If photoresistor 54 is detecting light, its resistance is too low to provide sufficient positive voltage to the base of transistor 58, and thus, little current flows through light emitting diode LED1. However, if low light levels are detected by photoresistor 54, it will have high resistance and thus increase the voltage at the base of transistor 58. This will open transistor 58 and provide current to illuminate LED1. Photoresistors by their nature have a built in delay when relaxing to their dark-state resistance. Thus, the circuit formed by resistors 52, photoresistor 54, resistor 56, and transistor 58 represents one possible circuit for photo sensor 32.

Figure 3A:
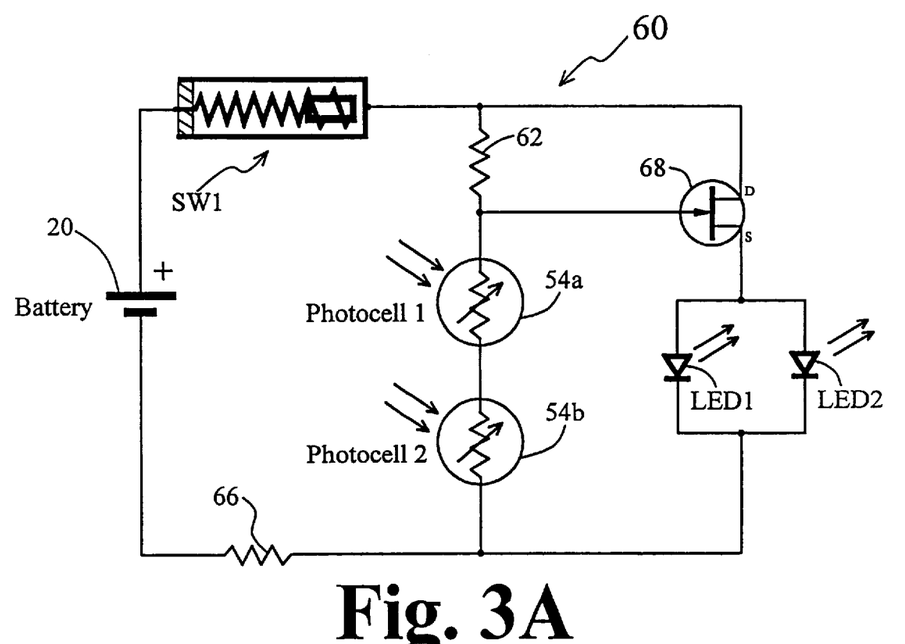
FIG. 3A Safety Light Circuit Schematic with delay.

In FIG. 3A we see circuit 60 which is essentially the same as circuit 16 (FIG. 3), but has been modified to work specifically for in-line roller skate wheels, but would also work well in other rotating assemblies. Two photoresistor 54a and 54b are used instead of just one and placed opposite each other within a roller blade wheel (see FIG. 6), that is, they are placed 180 degrees apart around the axis to the wheel. Using two photoresistors allows one of the photoresistors to be substantially un-obscured by the wheel supports 81a and 81b on a standard in-line roller skate at any given moment. Resistor 62 biases junction field effect transistor (JFET) 68 so that both photoresistors must be in the dark at the same time to open JFET 68 which acts as a current switch. When JFET 68 opens it allows current to flow though light emitting diodes LED1 and LED2 with very little voltage drop across JFET 68 itself. During daytime use, one photoresistor may be detecting a dark environment because it is in the shadow of the wheel supports 81a and 81b, but the other will be in the open to sense light, thus, insufficient voltage drop occurs over the two photoresistors to open JFET 68. Battery power is thus conserved when roller skating during the day when there is sufficient ambient light. At night, both photoresistors would be in the dark at the same time, and thus, JFET 68 would open and illuminate LED1 and LED2. Acceleration switch SW1 could have a delay circuit added to it like circuit 76 (see FIG. 5), but for roller skate wheels such a delay is not essential since the small size of the wheels create sufficient centripetal acceleration to light them up almost immediately when the user starts moving. Resistor 66 is optional in this circuit and only serves to limit current through LED1 and LED2. However, in practice, battery 20 is so small that it cannot produce sufficient current to even burn out one LED, but it is sometimes desirable to limit current to lengthen operating time of the battery. Current can also be limited by the proper selection of resistor 62 so that JFET 68 is not completely opened when photoresistors 54a and 54b are detecting darkness. Thus, resistor 66 is optional, but can help stabilize the circuit output current as components age.

Circuit 16 in FIG. 3 can obtain nearly the same efficiency advantages obtained by the delay circuit seen in FIG. 3A simply by positioning the components in the proper position on the wheel. For example, if acceleration switch SW1, Photocell 54 and LED1 are all placed near the same place on a wheel all these components will be at their most effective position at the same time. For example, the acceleration switch is most effective near the ground because acceleration is higher there. Near the ground gravity is added to the centripetal acceleration of the wheel making it easier for the acceleration switch to activate. Where as, at the top of its rotation, gravity subtracts from the centripetal acceleration the acceleration switch is detecting. Thus, there is a window where the rotation speed of the wheel would allow the acceleration switch to be closed as it rotates near the ground and open when at the top of the wheel. If LED1 is near the acceleration switch then it would only come on when near the ground during this speed range. This saves power even during the night by not lighting up LED1 when the illumination light is behind wheel supports 81a and 81b on an in-line roller skate 80. If photocell 54 is also placed near the acceleration switch, then it will be behind the wheel supports at the same time the acceleration switch is experiencing its minimum acceleration. In this way the acceleration switch can be non-conducting when the photocell is in the shadows of the wheel supports and wanting to conduct current. The photocell would then shut off current to LED1 as it came out from behind the wheel supports, just as the acceleration switch would start closing because of increased acceleration. Thus during the day, the acceleration switch and photocell would alternately switch on and off to keeping LED1 off within a specific speed range.

Figure 4:
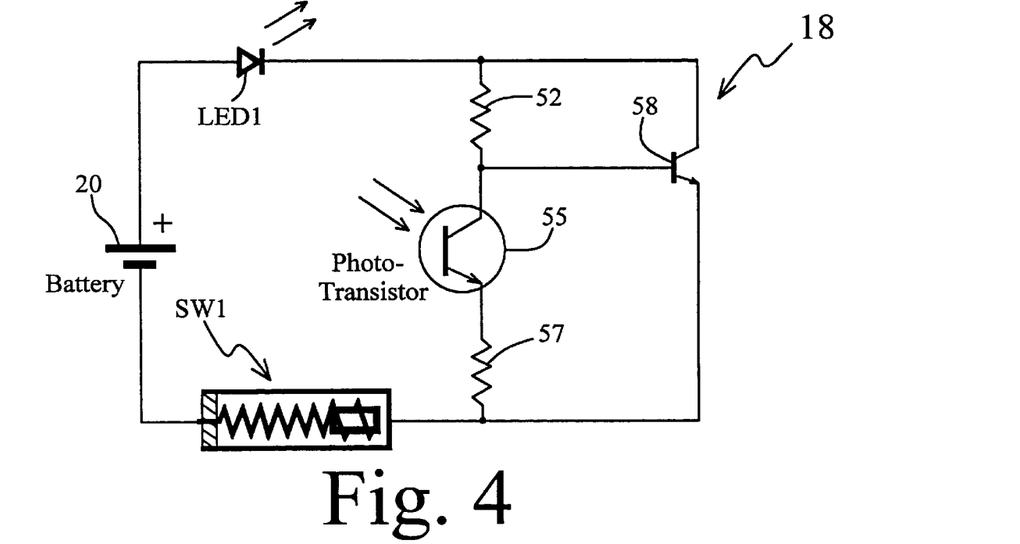
FIG. 4 Alternate Safety Light Circuit Schematic.

In FIG. 4, we see circuit 18 which is a rearranged circuit 17, demonstrating that the battery, acceleration switch, photo sensor and illumination device can be place anywhere within the series circuit and still operate. For this particular design resistor 57 must be smaller than resistor 56 in FIG. 3, since less biasing is needed now that light emitting diode LED1 is no longer rising the voltage at the emitter of transistor 58. Also photoresistor 54 has been replaced by phototransistor 55 demonstrating that either will work.

Figure 5:
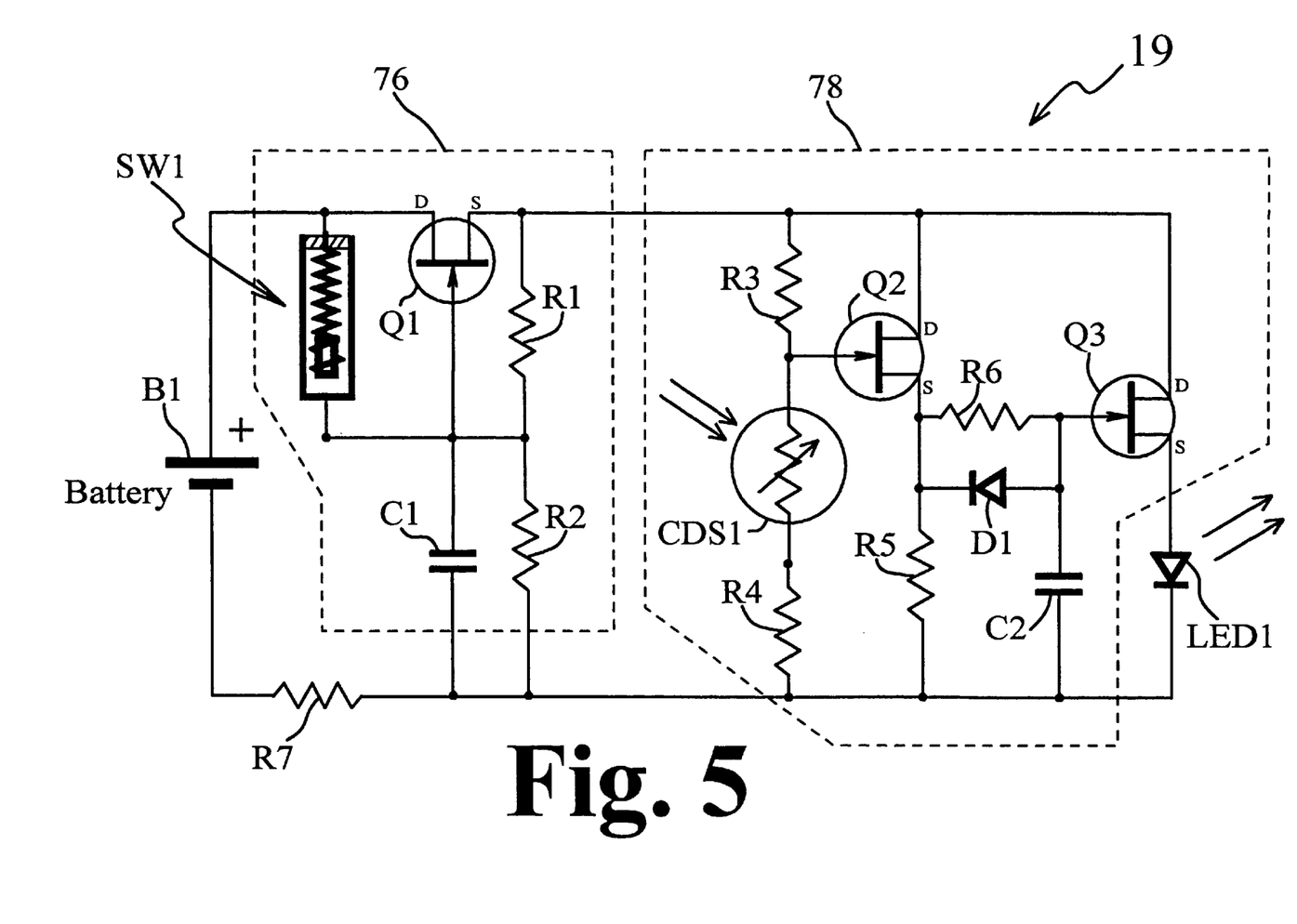
FIG. 5 Safety Light Circuit Schematic with delay circuits.

In FIG. 5 we see circuit 19 which includes delays for both acceleration sensor circuit within box 76 and the photo sensor circuit within box 78. Junction Field Effect Transistors (JFETs) Q1, Q2, and Q3 in this design are all N-channel and act as current switches to provide low in-series voltage drop for both the acceleration sensor and photo sensor, and to provide very high impedance off-states for the sensors. Other types of FETs can be used in place of the JFETs, including Metal Oxide Semiconductor Field Effect Transistors (MOSFETs), but would require the circuit to be redesigned slightly to properly bias the MOSFETs.

The circuit in FIG. 5 is a one example of how the circuit in FIG. 2 could be wired, with the components in box 76 representing one possibility for acceleration sensor 30, and the components in box 78 representing one possibility for photo sensor 32. Many other ways exist, but this one functions well. One set of working values for the components are as follows:
B1 Panasonic 3 v lithium battery 2032
LED1 Red Super Bright LED from LiteON
SW1 Acceleration switch (2 g switch)
Q1,Q2,Q3 N-channel JFET-NTE458 (low voltage)
C1 1–10 $\mu$F for a delay of 15 to 150 seconds respectfully
C2 0.2 $\mu$F for approximately 10 second delay
D1 Any standard diode
R1 1/16 W 50 M$\Omega$
R2 1/16 W 20 M$\Omega$ (works well with R1=20 M$\Omega$ when R2=10 M$\Omega$, but C1 must be twice as larger to create the same delay)
R3 57 k$\Omega$
R4 20 k$\Omega$
R5 5.1 M$\Omega$
R6 20 M$\Omega$
R7 NONE—Values for R1 through R6 provide 12 ma current through LED1 (Can be added to help stabilize current flow as components age.)

JFET Q1 passes current whenever acceleration switch SW1 is closed, and JFET Q3 passes current (closed circuit-JFET open) when JFET Q2 passes current. By using JFETs, instead of Bipolar transistors the series voltage drop across these sensors is very small, thus allowing battery B1 to be low-voltage. The JFETs also provide very high resistance when in their off-state. The circuit in FIG. 5 draws approximately 0.1 micro amperes ($\mu$A) when acceleration switch SW1 is open. This translates into a 240 year standby battery drain time for the 2032 button battery. This is much longer than its storage life.

The acceleration sensor circuit 76 comprises acceleration switch SW1, N-channel Junction Field Effect Transistor (JFET) Q1, delay timing capacitor C1, bias resistor R1 and delay timing resistor R2. When acceleration switch SW1 detect sufficient acceleration it conducts current (closed circuit) from the positive terminal of battery B1 to the gate of JFET Q1. Capacitor C1 is quickly charged which raises the gate voltage and effectively opens the gate so current flows freely through JFET Q1 and into photo sensor circuit 78. After acceleration switch SW1 no longer senses acceleration (open circuit) the voltage on capacitor C2 keeps JFET Q1 conducting. As charge drains from capacitor C1 through resistor R2 and to a lesser extent through resistor R1, the voltage on the gate of JFET Q1 begins drop which eventually closes the gate and cuts-off current flow. A very small amount of current continues to flow through JFET Q1 even after capacitor C1 is drained to keep resistors R1 and R2 biased. This small current must continue flowing to keep JFET Q1 biased closed. R1 should be approximately 3 times greater than R2 to make sure Q1 is completely off, and that a current of only 0.1 $\mu$A leaks through Q1.

The very high impedance of the gate allows resistors R1 and R2 to be very large and, thus, the delay circuit to use a small value for capacitor C1. Capacitor C1 and Resistor R2, form an RC delay timer which delays the closing of JFET Q1 long after switch SW1 has stopped conducting. To a lesser extent resistor R1, photo sensor circuit 78, and light emitting diode LED1 also effect timing. With resistor R2=50 M$\Omega$, resistor R2=20 M$\Omega$, and capacitor C1=1 microfarad ($\mu$F), the RC time constant is approximately 15 seconds. Larger time delays can be obtained by increasing the resistance of resistors R1 and R2 or by increasing the capacitance of capacitor C1.

Photo Sensor circuit 78, comprises resistors R3, R4 and R5, JFETs Q2 and Q3, Photoresistor CDS1 and delay timing capacitor C2. Resistor R3, photoresistor CDS1 and resistor R4 form a voltage divider which biases the gate of JFET Q2. When bright light is present a typical photoresistor will have a resistance of 300 ohms, while in a dark environment it may have a resistance of 40,000 ohms. Thus, by selecting values for resistors R3 and R4, JFET Q2 can be biased "off" when light is present and biased "on" (conducting) when in the dark. This effectively forms a photo sensor switch which charges capacitor C2 through resistor R6 when insufficient light is detected. Resistor R6 and Capacitor C2 form a delay circuit which delays the turn on of JFET Q3. As capacitor C2 charges, the gate on JFET Q3 becomes positive and begins to open and conduct current through light emitting diode LED1. The circuit can power two or more LEDs by placing them in parallel with LED1. Diode D1 has been added to have a differential rate of charging and discharging of capacitor C2. Resistor R6 is selected to be much larger than resistor R5 so that capacitor C2 charges slowly through resistor R6, but can discharge quickly through diode D1 and resistor R5. The result of this design is that during repeated periodic darkness the voltage can not build-up on capacitor C2, because during the times when light is present C2 discharges much more quickly than it can be charged during times of darkness. Values of R5=5.1 M$\Omega$ and R6=20 M$\Omega$ work well, with only a very small current flow through LED1 during periodic darkness, even when the time in darkness is much longer than the time in a lighted environment. This allows the circuit to conserve battery power when placed on such items as in-line roller skates, bikes with large fender, and etc. where the safety light is placed in a repeating periodic dark environment. When C2 charges to a sufficient positive voltage JFET Q3 opens and allows current to flow through LED1. Note that the photo sensor circuit 78 only receives power when the acceleration sensor is conducting. Thus, both acceleration must be detected, and substantially continuous darkness sensed for circuit 19 to allow substantial current to flow from battery B1 through LED1.

Figure 6:
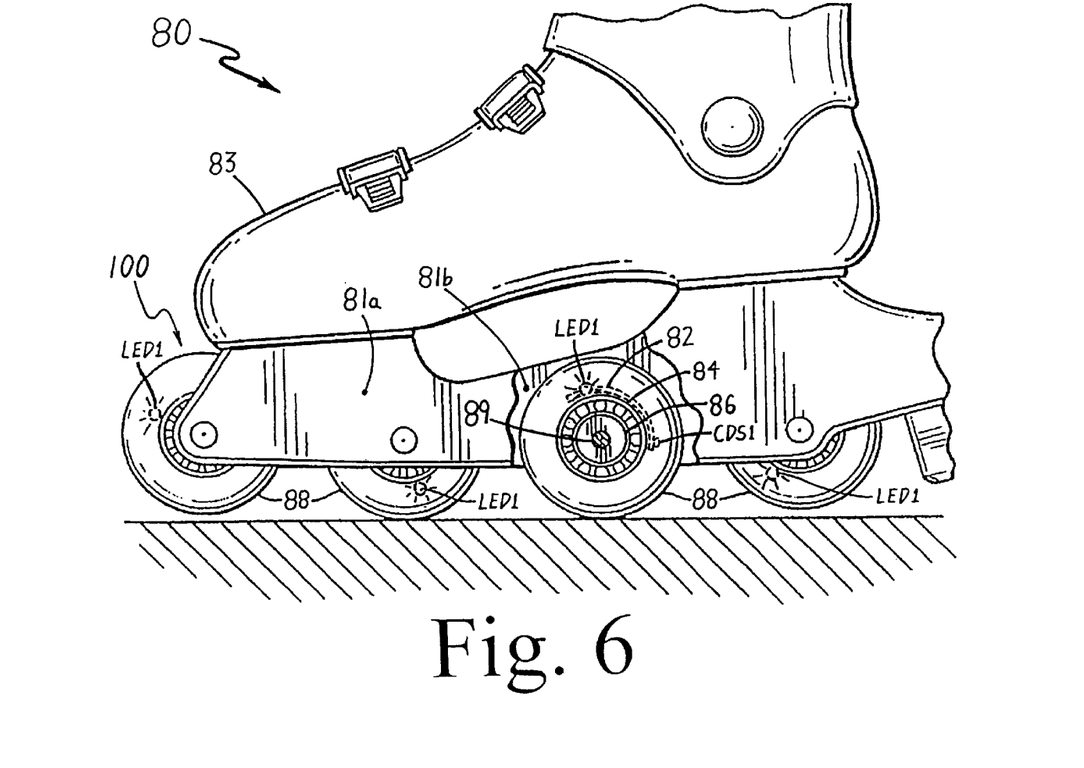
FIG. 6 In-Line Roller Skate with Safety Light Wheels.

In FIG. 6, we see a typical in-line roller skate 80, having a boot section 83, wheel supports 81a and 81b, and a set of four safety light wheels 100. The wheels have a standard sized central hub 84 which receives standard bearings 86. The entire circuit board 82 is completely sealed withing clear urethane tire 88 and allows light to shine outward from light emitting diode LED1, and also allows ambient light to shine inward onto photoresistor CDS1. Wheels 100 are attached between supports 81a and 81b with a wheel bolt 89 and a pair of wheel bearings 86. In this way the wheels can rotate freely within the supports.

Figure 7:
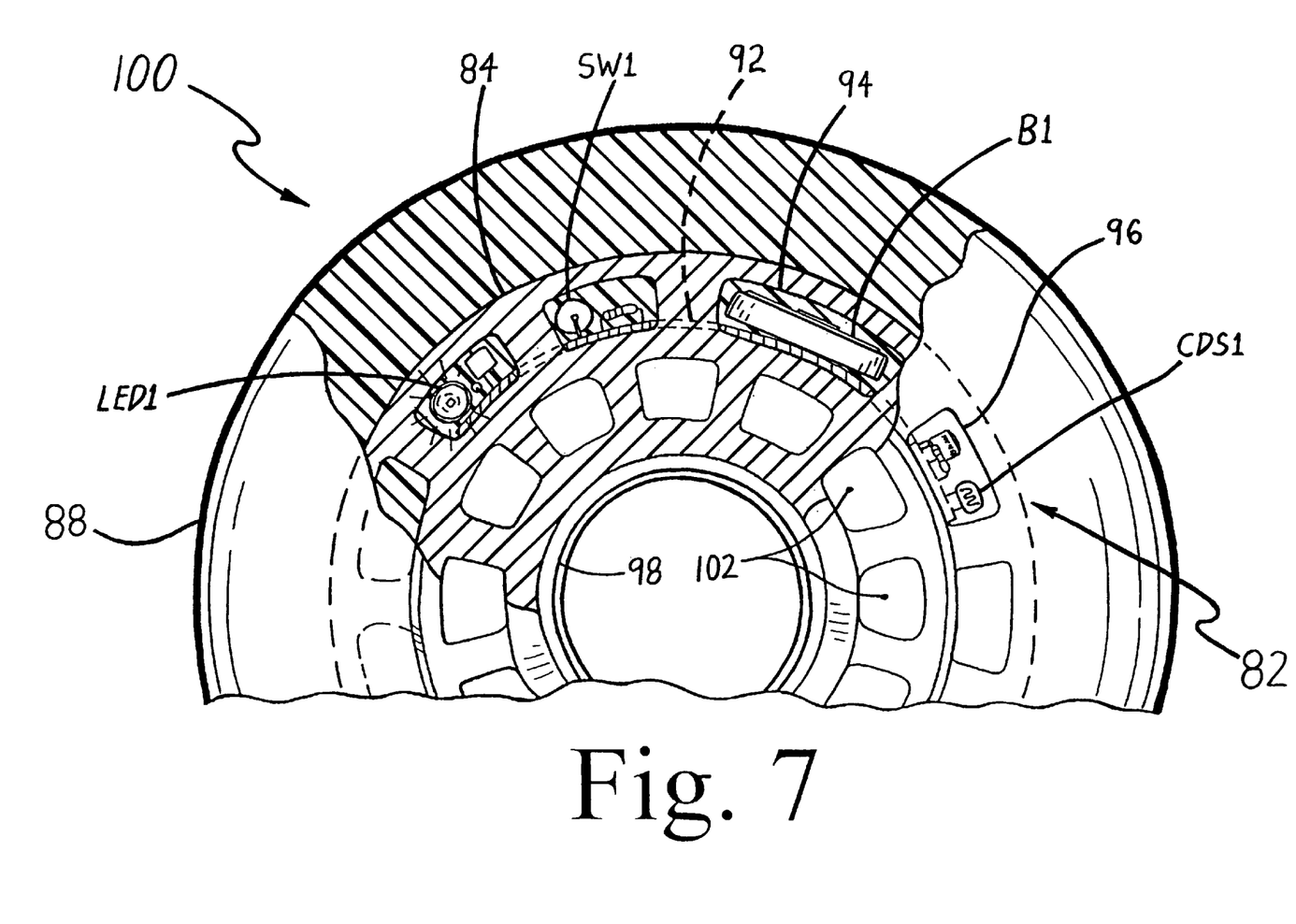
FIG. 7 In-Line Roller Skate Wheel with Safety Light.

In FIG. 7 we see a partially sectioned in-line roller skate wheel 100. Standard Wheel hubs (central hub) have opposed bearing landings 98 and air channels 102. Central hub 84 supports circuit board 82 while urethane tire 88 is molded onto the central hub 84. Circuit board 82 has tongues that fit into small slots 94 and large slot 96. During molding of tire 88 these slots are filled with urethane, completely enclosing the circuit board, and sealing it within the wheel. Major components of circuit 19 (see FIG. 5) are shown on circuit board 82, including light emitting diode LED1, acceleration switch SW1, battery B1, and photoresistor CDS. The section of circuit board 82 with Battery B1 on it, fits into large slot 94 in central hub 84. The remainder of the components are shown placed within small slots on hub 84. LED 1 and photoresistor CDS1 are placed at opposite ends of the circuit board to reduce the chance of LED1 illuminating the photoresistor. If two LEDs are used the circuit board could reach halfway around the hub and have a LED at each end and the photoresistor CDS1 in the center. Standard in-line roller skates wheels already have slots in there hub and would only need minor changes to allow for the larger size of the battery. Tire 88 can be made of any of a number of durable transparent polymers, clear urethane being the most commonly used.

Figure 8:
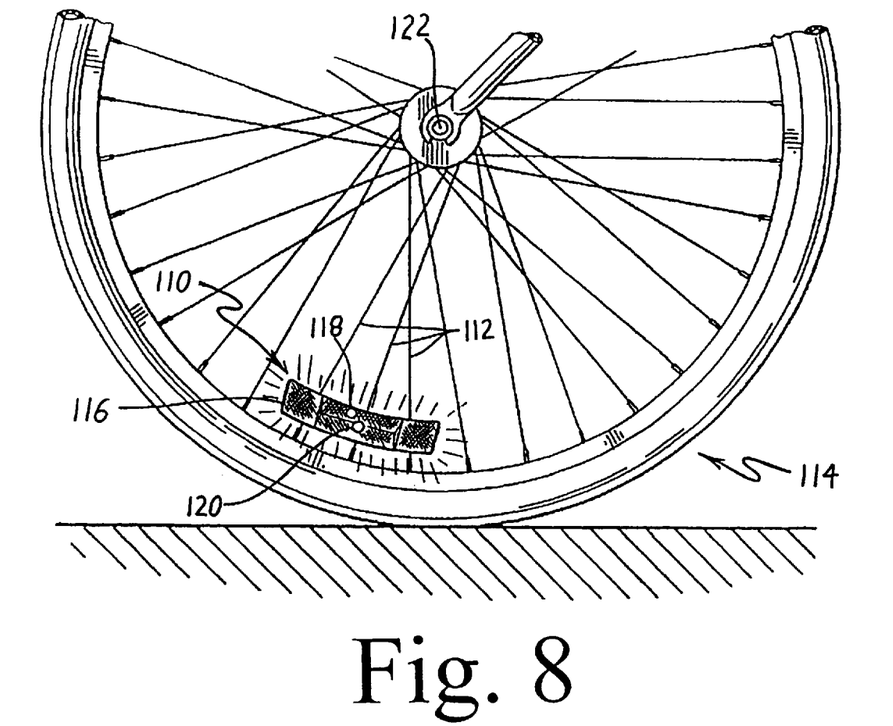
FIG. 8 Bicycle Wheel with Safety Light Reflector.

In FIG. 8 we see another possible use for the disclosed safety light as integrated with a bicycle reflector to make safety reflector 110. The safety light circuit is placed inside a reflector housing 116, which is mounted on a standard bicycle wheel 114, and attached to a standard bicycle with bearing 122. Safety reflector 110 would contain a safety light circuit similar to those shown in FIGS. 1 through 5 with a reflector housing 116 molded around it. Through window 118, light can enter to control the photo sensor. Through window 120, light is allowed out from a light emitting diode. Safety reflector 110 is mounted on spokes 112 of the bicycle wheel. The safety reflector can be attached to the spokes in any number of standard methods (not shown) including screw down tabs, screw down back plate, retaining clips, snap fit clips, wire tie downs or even wedging the safety reflector between the spokes.

Figure 9:
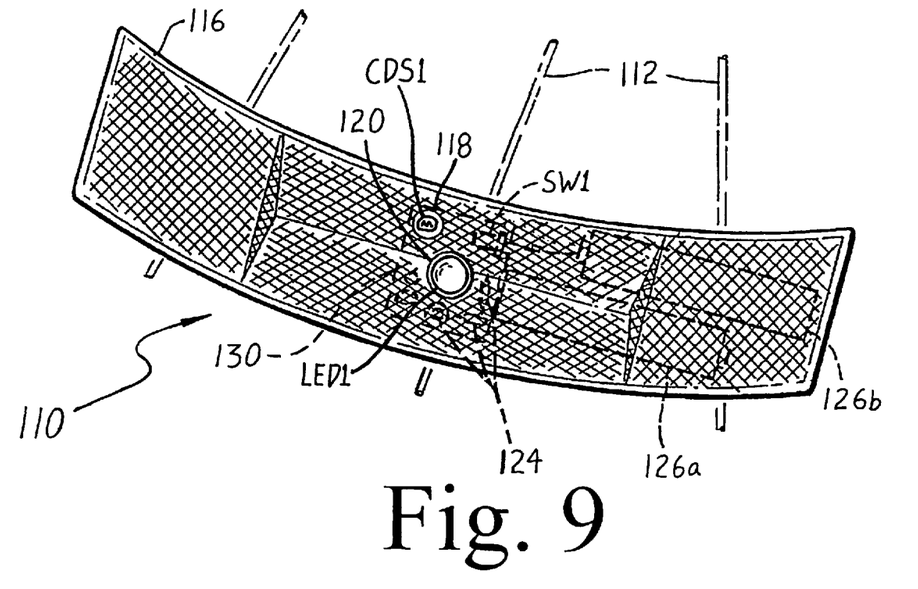
FIG. 9 Safety Light Reflector for Bicycle.

In FIG. 9 we see a close-up of safety reflector 110. Light emitting diode LED1 is centered behind window 120 and photoresistor CDS1 is centered behind window 118. Circuit board 130 holds all the electronic component 124, including acceleration switch SW1 Two AA batteries 126a and 126b are connected in series to provide an inexpensive 3 volt power supply and to provide long life for the safety reflector. This type of safety reflector would be useful on children's tricycles as well as bicycles. Protecting them at night by alerting motorists of there presence in the road. This type of safety reflector may also be used on motorcycles providing a strong visual cue that a two wheeled vehicle is present. In fact, its greatest potential to save lives may be in its use on motorcycles.

Figure 10:
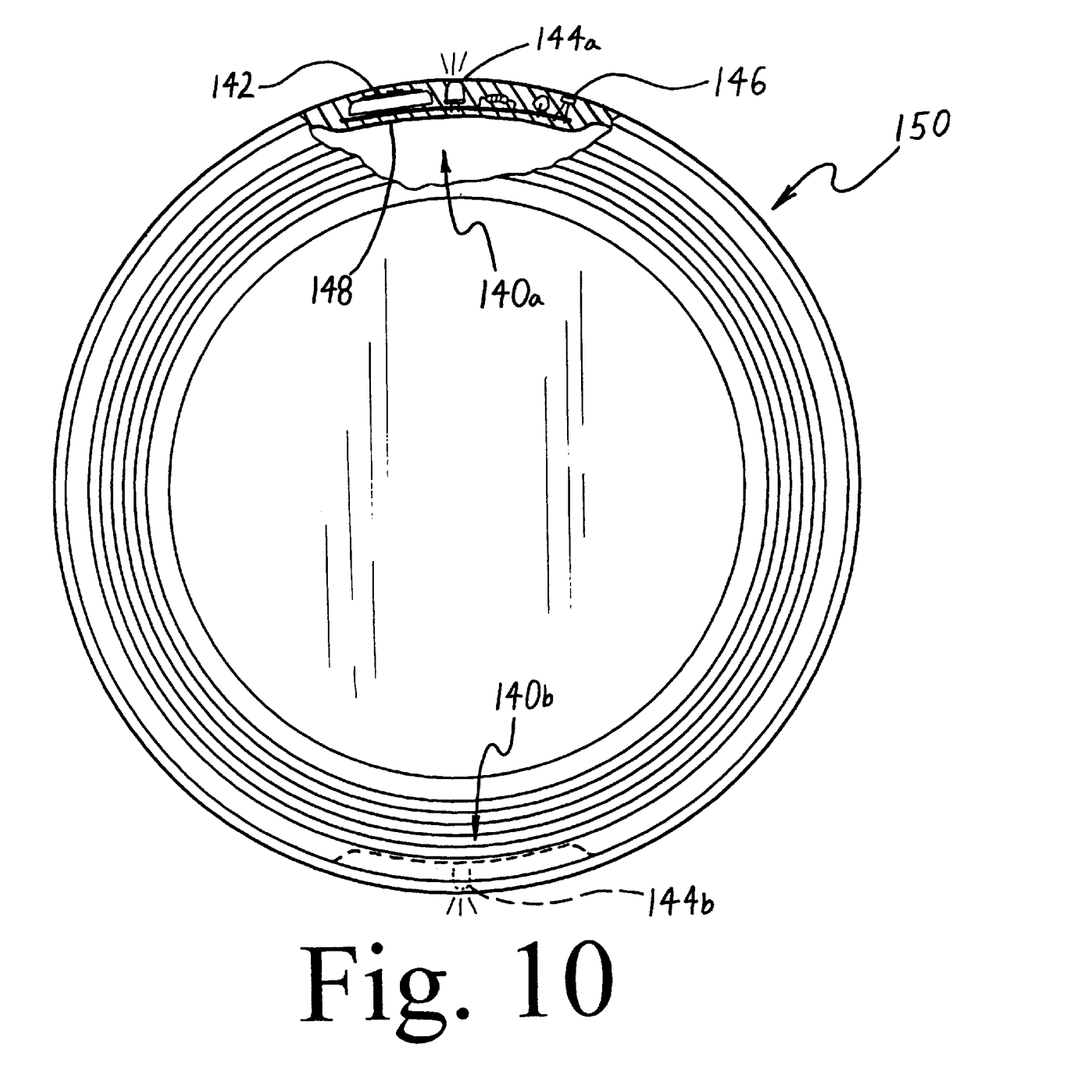
FIG. 10 Safety Light Circuit molded into Flying Disc.

In FIG. 10 we see another application of the safety light circuit. A flying disc toy 150 is shown with two safety light circuits 140a and 140b molded into the rim of the flying disk. Though only one safety light circuit is needed, two produce more light and help balance the flying disk when safety circuits 140a and 140b are placed opposite each. One of the safety circuits can be replaced with a mass to provide less expensive flying disc which is still balanced. Battery 142, LED 144a, photoresistor 146 and the rest of the circuit are molded into a thickened section 148 of the rim. LED 144a and photoresistor 146 are mounted near the surface of flying disk 150 so that light can shine out and in respectfully. The flying disk could be molded from a semi-transparent plastic or transparent plastic so that the components can be completely enclosed to prevent damage to the circuit. Safety light circuit 140b is identical to 140a and simply placed opposite and opposed to each other on the flying disk with LED 144b projecting light out in the opposite direction of LED 144a. Alternatively, the circuit need not be on the rim of the flying disk, but could work equally well when placed on the surface of the disk with the LEDs shining radially from the top of the flying disk.

SUMMARY, RAMIFICATIONS, and SCOPE

The safety light disclosed here has many uses including such important safety uses as lights on tricycles, bicycles, roller skates, mopeds, and motorcycles, as well as, fun application such as placing them in frisbees and yo-yos. The safety light can be made very compact with very few components, and is made highly reliable because it can be hemispherically sealed within an enclosure. Permanently sealing the safety light in a housing is made possible by a combination of innovations which reduce battery use only to times when it is needed, that is, when both the rotation of the assembly is detected and when a low ambient light level is detected. Automatic activation of the safety light greatly improves its effectiveness by always being "ON" when needed, and does not rely on anyone to turn them on to be used properly. This also eliminates the need for external switches which can cause reliability problems.

Although the above description of the invention contains many specifications, these should not be viewed as limiting the scope of the invention. Instead, the above description should be considered illustrations of some of the presently preferred embodiments of this invention. For example, many different configurations of the four basic components (battery, acceleration sensor/motion sensor, photo sensor, and illumination device) are possible, and many different configuration of each of these components already exist and are well known. Some of these configuration are shown in this disclosure, but room does not allow for discussion of the nearly endless ways these four basic components can be combined. For example, even though acceleration switch SW1 is the only way shown in the drawings for detecting acceleration, integrated circuit (IC) accelerometers and angular acceleration switches would also work. Even a simple infrared motion sensors could be used to detect movement (acceleration) of the assembly, in fact, the acceleration sensor and photo sensor may be combined into a single motion sensor which detects motion as well as the light-level with the same photocell. Other option include replacing the photocell with a series of photovoltaic cells connected directly to the gate of a JFET transistor to provide a simple photo sensor circuit that would have a built in delay since voltage on the gate would have to slowly drain away before the JFET would conduct current. Also, a simple occilator could be added to any of these circuits to provide a strobe effect when the safety light is ON.

Thus, the scope of this invention should not be limited to the above examples, but should be determined from the following claims.

We claim:

1. An illuminated skate wheel, comprising:
   a central hub adapted for attachment to skate shoes and made of a hard high-impact plastic material;
   an electronic circuit comprising;
      a battery for providing electromotive power;
      a motion sensor for detecting acceleration and vibration of the wheel;
      a photo sensor for detecting low ambient light levels; and an illumination device;
   a substantially translucent polymer tire molded around said central hub to form a complete wheel;
      said electronic circuit completely and permanently sealed within said wheel to protect the circuit from both mechanical stress and the environment, and said illumination device can project light out through said translucent polymer tire;
   said electronic circuit is connected electrically for conducting substantial current from said battery through said illumination device when both the motion sensor detects movement of the wheel, and the photo sensor detects low ambient light levels;
   said electronic circuit further includes a first delay means adapted to delay onset of current flow through said illumination device for a period of time after ambient light levels have suddenly decrease, whereby the circuit prevents waste of battery power when the photo sensor momentarily rotates into the shadow of the skate shoe.

2. The illuminated wheel in claim 1, wherein, said motion sensor includes a second delay means, said second delay means adapted to keep current flowing pass said motion sensor for a duration of time after said motion sensor has stopped detecting motion.

3. An illuminated skate wheel, comprising:
   a wheel portion defined for use on skate shoes being made of a substantially translucent polymer material;
   an electronic circuit comprising;
      a battery for providing electromotive power;
      a motion sensor for detecting centrifugal force and vibration having a first conductance means associated with said motion sensor for conducting electrical current when such centrifugal force and vibration is detected;
      a photo sensor for detecting a substantially dark environment, having a second conductance means associated with said photo sensor and designed for conducting current when low light levels are detected;
      an illumination device;
   said electronic circuit completely and permanently enclosed with said wheel portion, thereby protecting it from environmental hazards, and said illumination device can project light out through said translucent polymer material;
   said first and second conductance means connected electrically such that substantial current is conducted from said battery to said illumination device only when the illuminated wheel is in active use under a substantially continuous dark environment;
   said electronic circuit further includes a first delay means for substantially stopping conduction through said second conductance means for a period of time after said photo sensor has detected a sudden decrease in ambient light level.

4. The illuminated wheel in claim 3, herein said electronic circuit further includes a second delay means for providing conduction pass said first conductance means for a duration of time after said motion sensor no longer detects movement sufficient for activation.

* * * * *